US006971069B2

(12) United States Patent
Laiho et al.

(10) Patent No.: US 6,971,069 B2
(45) Date of Patent: Nov. 29, 2005

(54) METHOD AND ARRANGEMENT FOR RETRIEVING AN ENTRY FROM AN INDEXED MEMORY

(75) Inventors: Tero Laiho, Tokyo (JP); Jan Kinnunen, Ypäjä (FI)

(73) Assignee: Nokia Corporation, Espoo (FI)

( * ) Notice: Subject to any disclaimer, the term of this patent is extended or adjusted under 35 U.S.C. 154(b) by 487 days.

(21) Appl. No.: 10/107,234

(22) Filed: Mar. 25, 2002

(65) Prior Publication Data
US 2002/0143741 A1    Oct. 3, 2002

(30) Foreign Application Priority Data
Mar. 26, 2001  (FI)  .................................. 20010616

(51) Int. Cl.⁷ ................................................ G06F 3/00
(52) U.S. Cl. ...................................... 715/830; 715/810
(58) Field of Search .............................. 345/830, 973, 345/827–829, 712–713, 780, 784–786, 853–855, 345/864–865, 156, 184, 168–169; 379/433.06, 379/354, 364, 368, 433.04, 433.07, 433.13; 455/566; 707/3–4; 715/830, 973, 827–829, 715/712–713, 780, 784–786, 853–855, 864–865

(56) References Cited

U.S. PATENT DOCUMENTS

| | | | | |
|---|---|---|---|---|
| 5,436,954 A | * | 7/1995 | Nishiyama et al. | 455/566 |
| 5,754,645 A | * | 5/1998 | Metroka et al. | 379/433.12 |
| 5,786,819 A | * | 7/1998 | Weiser et al. | 345/840 |
| 5,982,876 A | * | 11/1999 | Albesa | 379/354 |
| 6,037,942 A | * | 3/2000 | Millington | 345/835 |
| 6,052,070 A | * | 4/2000 | Kivela et al. | 341/22 |
| 6,157,323 A | * | 12/2000 | Tso et al. | 341/22 |
| 6,173,194 B1 | * | 1/2001 | Vanttila | 455/566 |
| 6,362,814 B1 | * | 3/2002 | Aizawa | 345/169 |
| 6,370,363 B1 | * | 4/2002 | Fukuzato | 455/90.1 |
| 6,373,450 B1 | * | 4/2002 | Fujita | 345/26 |
| 6,502,090 B1 | * | 12/2002 | Raisanen | 707/3 |
| 6,535,461 B1 | * | 3/2003 | Karhu | 368/10 |
| 6,545,588 B1 | * | 4/2003 | Wicks et al. | 340/7.21 |
| 6,633,277 B1 | * | 10/2003 | Ivanov | 345/167 |
| 6,643,371 B2 | * | 11/2003 | Mager | 379/355.07 |

(Continued)

FOREIGN PATENT DOCUMENTS

EP        0813138 A1    12/1997

(Continued)

*Primary Examiner*—Sy D. Luu
(74) *Attorney, Agent, or Firm*—Perman & Green, LLP

(57) ABSTRACT

A method and arrangement are disclosed for scrolling between entries in an indexed list as a response to scrolling commands given through the activation of selectors. The indexed list is arranged into sections so that all entries of a section have at least one equally valued indexable property and each section has a first entry. Scrolling (202, 311, 408, 502, 614, 701, 702, 704, 705, 707, 708) to the first entry of a certain section takes place as a response to a first scrolling command, and scrolling (201, 308, 406, 501, 611) from an entry in the indexed list to the immediately adjacent entry in the indexed list takes place as a response to a second scrolling command. The step of scrolling to the first entry of a certain section is executed as a response to a first scrolling command (309, 313, 407, 612, 616) given through the activation of a scrolling selector. The step of scrolling from an entry in the indexed list into the immediately adjacent entry in the indexed list is executed as a response to a second scrolling command (305, 405, 609) given through the activation of the same scrolling selector.

14 Claims, 7 Drawing Sheets

U.S. PATENT DOCUMENTS 6,697,483 B1 * 2/2004 Saarinen et al. ............ 379/354
2001/0044338 A1 * 11/2001 Cheng ........................ 463/36
2003/0107500 A1 * 6/2003 Lee ............................. 341/22

FOREIGN PATENT DOCUMENTS

WO     WO 93/14589     7/1993

* cited by examiner

METHOD AND ARRANGEMENT FOR RETRIEVING AN ENTRY FROM AN INDEXED MEMORY

TECHNOLOGICAL FIELD

The invention concerns generally the technology of retrieving entries from indexed memories. Especially the invention concerns the technology of optimizing the amount and type of user action for retrieving a certain entry from an indexed memory.

BACKGROUND OF THE INVENTION

Indexed memories in general serve as storages for various indexed lists. An entry in an indexed list consists of one or more fields. A typical feature of indexed lists is that the entries contained therein may be arranged and retrieved in a certain order, according to the ascending or descending values of a certain field which has been selected as the index field for the entries in the list.

A typical example of an indexed list stored in the memory of an electronic device is the list of names, telephone numbers and potentially other associated information which is stored in the memory of a mobile telecommunication device such as a mobile phone. The user of the mobile telecommunication device needs frequently to access the list of stored entries in order to find the telephone number of the intended recipient of a call. The stored entries have most often only three fields, namely the NAME field, the TELEPHONE_NUMBER field and the MEMORY LOCATION NUMBER field. Additional fields may include fields like ADDRESS, SECOND_TELEPHONE_NUMBER etc. The NAME field is usually selected as the index field.

FIG. 1 illustrates a conventional method of accessing the entries in a list through the use of alphanumeric keys and arrow keys. Only the contents of the NAME fields are shown. Operation begins when the user presses a certain key, which in this example is the "2abc" alphanumeric key. The first entry in the ascending order of the value in the index field is shown. If the user presses the "2abc" alphanumeric key again, the first entry beginning with B is shown, and a third press on the "2abc" alphanumeric key shows the first entry beginning with C. If, at some step of operation, the user presses the "3def" alphanumeric key once, the first entry beginning with D is shown. At any step of operation pressing the arrow down key gives the immediately following entry in the ascending order of the value in the index field. Some "arrow down" indications are omitted in FIG. 1 to preserve graphical clarity (for example pressing arrow down at ARN ELISABETH leads to BERNSTEIN LEONARD although this is not illustrated in FIG. 1).

The known method of retrieving entries from the list does not come without drawbacks. As an example we may consider a situation where the user has stored the number of an emergency exchange under the name "EMERGENCY". Additionally the user has stored a large number of other entries where the value in the NAME field begins with the letter E which is immediately followed by another letter which is before M in the alphabet. In order to retrieve the number of the emergency exchange the user has to initiate the retrieval of entries, press two times the "3def" key and press the arrow down key for a large number of times. In an urgent situation such a complicated sequence of key presses may confuse the user and cause unnecessary loss of time.

SUMMARY OF THE INVENTION

It is an object of the present invention to provide a method and an arrangement for retrieving entries from an indexed list with a small amount of required user action. It is an additional object of the invention to provide such a method and arrangement which users regard as smooth and sophisticated.

The objects of the invention are achieved by defining double functions for a single actuatable selector depending on the duration or force of actuating the selector, so that a first function is related to scrolling through the indexed list at a first hierarchical index level and a second function is related to scanning through the indexed list at a second, lower hierarchical level.

The method according to the invention comprises the steps of
    arranging the indexed list into sections so that all entries of a section have at least one equally valued indexable property and each section has a first entry,
    scrolling to the first entry of a certain section as a response to a first scrolling command and
    scrolling from an entry in the indexed list into the immediately adjacent entry in the indexed list as a response to a second scrolling command;
it is characteristic to the method according to the invention that
    the step of scrolling to the first entry of a certain section is executed as a response to a first scrolling command given through the activation of a scrolling selector and
    the step of scrolling from an entry in the indexed list into the immediately adjacent entry in the indexed list is executed as a response to a second scrolling command given through the activation of the same scrolling selector.

The invention applies also to an arrangement which comprises
    an activatable scrolling selector,
    indication means for indicating selected entries,
    a data memory for storing and retrieving entries of the indexed list and
    a processor which is arranged to respond to scrolling commands given through the activation of the scrolling selector by selecting stored entries from the data memory and indicating selected entries through the indication means;

it is characterized in that the processor is arranged to
    respond to a first scrolling command given through the activation of the scrolling selector by scrolling to the first entry of a certain section of the indexed list and selecting that entry for indication through the indication means and
    respond to a second scrolling command given through the activation of the same scrolling selector by scrolling from an entry in the indexed list into the immediately adjacent entry in the indexed list and selecting that entry for indication through the indication means.

The introduction of different hierarchical levels into the task of scrolling through an indexed list is well known: for example in the example illustrates in FIG. 1 there is the upper hierarchical level where those entries where the NAME field begins with the same letter constitute a section, and the user may jump from the beginning of a first section (or from any part of a first section) to the beginning of any other section by actuating certain selectors. The lower hierarchical level consists of all entries in the list and the user can scroll back and forth on the lower level by actuating the arrow keys. However, the research which led to the present invention showed that simply defining a number of hierarchical level does not help much in scrolling through the list if the user has a multitude of different selectors to choose from in order to make use of the various hierarchical levels.

According to the present invention there is defined, for at least one user-actuatable scrolling selector, at least two scrolling functions. The choice between initiating a first or a second scrolling function depends e.g. on the duration or force of actuating the selector. According to the "duration" approach, which is in many cases mechanically simpler to implement, actuating the selector for a short time initiates a first scrolling function whereas actuating the selector for a long time initiates a second scrolling function. According to the "force" approach, which is usually the most efficient one regarding the consumption of time, actuating the selector with limited force initiates a first scrolling function whereas actuating the selector with full force initiates a second scrolling function. A third possibility is the so-called "Shift+" approach where actuating the selector alone initiates a first scrolling function and actuating the selector simultaneous with or immediately after pressing a "shift" or "function" key initiates a second scrolling function.

A simple way of defining the two scrolling functions is to employ the known concepts of higher (scroll by section) and lower (scroll one by one) hierarchical levels and to associate the scrolling functions therewith so that initiating a first scrolling function means initiating the scrolling by section and initiating a second scrolling function means initiating the scrolling one by one. More complicated embodiments may be developed with more hierarchical levels and controlled transitions from level to level.

The actuatable selector is most advantageously a key in a keypad or a scrolling wheel. A simple push-button key is "OFF" when not pushed and "ON" when pushed, so that it is only suited for the "duration" approach. A more versatile push-button key is "OFF" when not pushed, "ON1" when pushed softly and "ON2" when pushed with greater force, which makes it suitable for both the "duration" approach and the "force" approach. A scrolling wheel may be scrolled slowly or fast. Also other forms of actuatable selectors may be used, such as joystick-, trackball- or touchpad-type controllers where multiple switching functions are available.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 was described previously in the description of prior art, so the following description of the invention and its advantageous embodiments concentrates on FIGS. 2 to 8c. Similar parts in the drawings are designated with same reference designators.

DETAILED DESCRIPTION OF THE INVENTION

Figure 1:
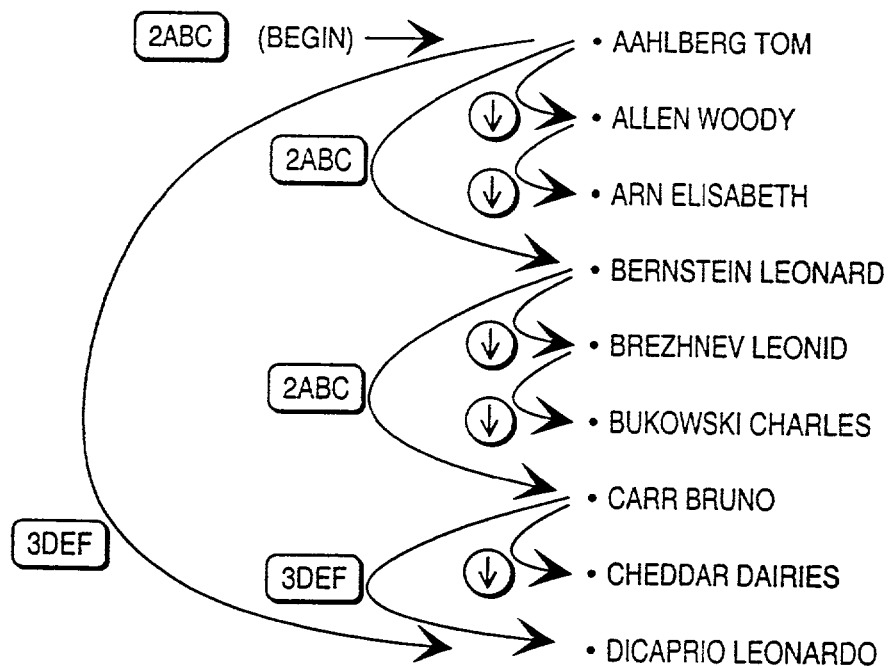
FIG. 1 illustrates a known method for retrieving entries from an indexed list.
Figure 2:
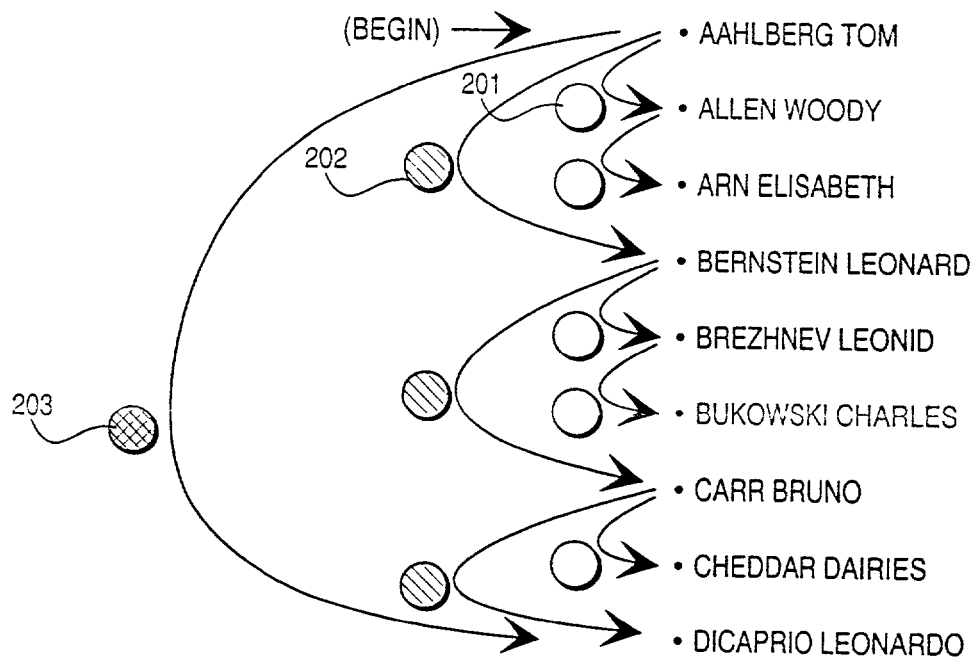
FIG. 2 illustrates a method according to an embodiment of the invention.

FIG. 2 illustrates the scrolling of the same list of entries as in FIG. 1 but using a method according to an embodiment of the invention. There is an actuatable selector which has multiple functions associated to it. In the exemplary case we assume that there are three functions associated with the selector, but this assumption does not limit the applicability of the invention: there may equally well be two functions or more than three functions. The list of entries is conceptually divided into sections, which in this exemplary case means that each section consists of those entries where the value in a NAME field begins with the same letter. This is not the only possible way of sectioning; we will return to other sectioning principles later. The whole list is arranged into an ascending order according to the value in the NAME field, which implies that the sections are in alphabetical order from section A to section Z (not shown) and within each section the entries of that section are also in alphabetical order.

Beginning the scrolling produces the first entry of the list i.e. AAHLBERG TOM. If the user actuates the selector with a way that is associated with the first function, the immediately following entry ALLEN WOODY is produced. The unhatched key 201 schematically illustrates this action. It is possible to scroll through the whole list this way: repeatedly actuating the selector with a way that is associated with the first function always produces the immediately following entry. In order to preserve graphical clarity, only a part of such selector actuations are shown in FIG. 2.

If the user actuates the selector with a way that is associated with the second function, the first entry in the immediately following section is produced. For example, from the first entry of the list AAHLBERG TOM it is possible to go directly to the first entry in the B section, i.e. BERNSTEIN LEONARD. The simply hatched key 202 illustrates this action. It is possible to scroll through the first entries of all sections in the list this way: repeatedly actuating the selector with a way that is associated with the second function always produces the first entry in the immediately following section. Actuating the selector with a way that is associated with the second function is allowed at any selected entry: for example if the third entry ARN ELISABETH were currently selected, actuating the selector with a way that is associated with the second function would again produce the first entry in the B section, i.e. BERNSTEIN LEONARD.

If the user actuates the selector with a way that is associated with the third function, the first entry in the Nth following section is produced, where N is a positive integer greater than 1. The manufacturer of the device where the method is going to be used sets the value of N, or it may even be settable by the user. For example, from the first entry of the list AAHLBERG TOM it is possible to go directly to the first entry in the D section, i.e. DICAPRIO LEONARDO by actuating the selector with a way that is associated with the third function. The double hatched key 203 illustrates this action. Also actuating the selector with a way that is associated with the third function is allowed at any selected entry. The third function may be described to be a generalization of the second function into "supersections" where each supersections consists of a certain number of sections.

The invention does not require that the lowest level of sectioning should always produce sections where the entries within a section have, within a first field, a value that begins with the same character. For example the level of "supersections" described above can be selected as the lowest level of sectioning, so that jumps between sections always mean jumps over whole groups of entries with equal initial letters. However, sectioning an alphabetically indexed list is often easiest to do according to the initial letter in a field, because users are already familiar with such sectioning.

Figure 3:
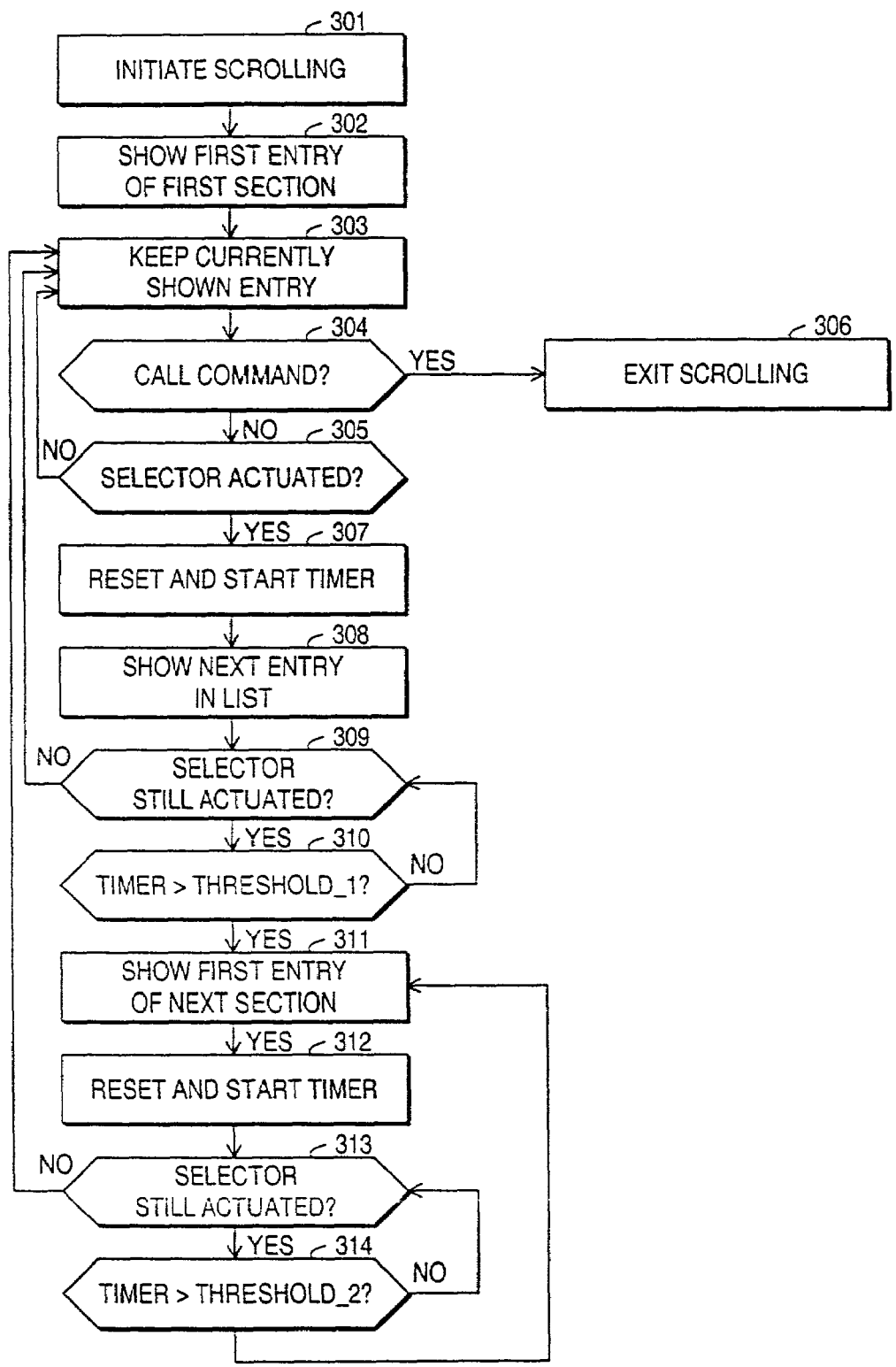
FIG. 3 illustrates a method according to another embodiment of the invention.

FIG. 3 is a more detailed flow diagram of a method according to an embodiment of the invention where exactly two scrolling functions are associated with a selector. The operation begins at step 301, where the scrolling of a list is initiated as a response to a certain command received from a user. At step 302 the first entry of the first section is shown and/or highlighted in a display. Step 303 is the one where the device implementing the method is waiting for the user to actuate the selectors: we assume for the sake of example that the device is a mobile telephone where the user is scrolling his telephone directory in order to find the intended recipient of a call he is about to make. In the absence of any selections the device goes repeatedly around the loop consisting of steps 303, 304 and 305. If the user decides to call the currently shown recipient, a positive answer is obtained at step 304 and the scrolling is terminated according to step 306.

If the user actuates the scrolling selector at step 305, a timer is reset and started at step 307. The purpose of the timer is to determine, whether the user actuates the selector for a "short" time or a "long" time. The actual values for "short" and "long" may be found through simulation and experimenting. We may further assume that the selector is a push-button, so short actuation means a short key press and a long actuation means keeping the key pressed at a longer time.

As an immediate response to the actuation of the selector there is shown the immediately following entry on the list at step 308. After that the device checks at step 309, whether or not the user is still keeping the selector actuated. A negative finding leads back to step 303. A positive finding at step 309 leads to step 310 where the value reached by the timer is compared against a first threshold which is the predetermined discriminator between a "short" and a "long" actuation. If the user keeps the selector actuated, the device circulates in the loop consisting of steps 309 and 310 until the threshold is reached. At any instant before that it is possible to stop actuating and return from step 309 to step 303.

A positive finding at step 310 leads to step 311, where the first entry of the next section is shown. Immediately thereafter the device resets and restarts the timer at step 312 and checks at step 313 whether the user continues actuating the selector. A negative finding at step leads again back to step 303 and a positive finding causes the device to circulate in the loop consisting of steps 313 and 314 until the timer reaches a second threshold value. Defining two different thresholds is advantageous because once the user has entered the "quick scrolling", i.e. jumping between sections, time is saved if the jump to the next section takes place after a shorted delay than what it took for the device to decide that "slow scrolling" is not requested.

An advantageous additional feature is the provision of a "back door" for exiting from any state described by the steps of FIG. 3 by e.g. pressing a cancel key. For reasons of clarity such additional features are not illustrated in FIG. 3.

Figure 4:
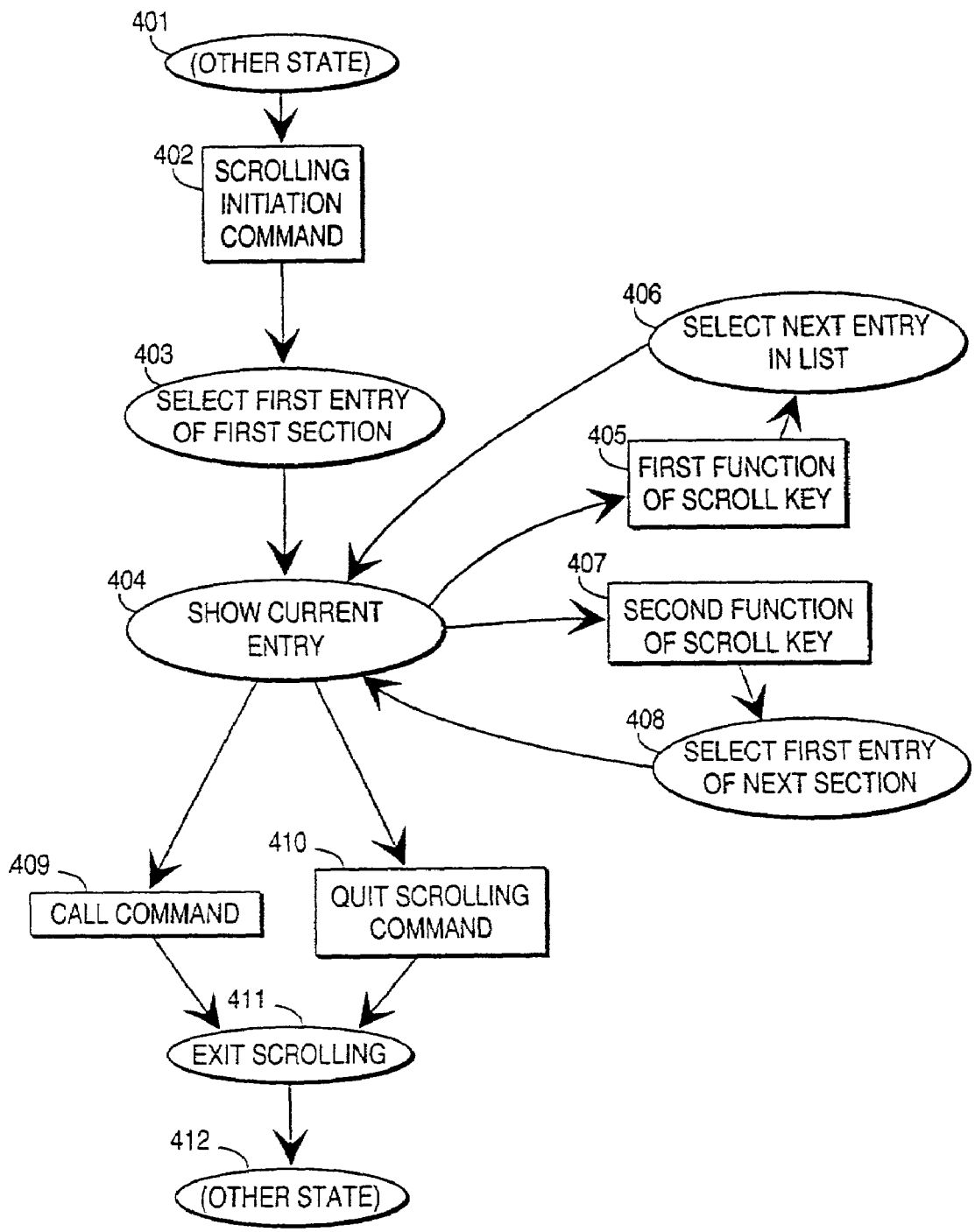
FIG. 4 illustrates a method according to another embodiment of the invention.

FIG. 4 is a state diagram that is better suited for the description of an embodiment of the invention according to the "force" approach than the flow diagram of FIG. 3. Before scrolling the device which implements the method (again a mobile telephone for the sake of example) is in some other state 401. A scrolling initiation command 402 brings the device into state 403 where the first entry of the first section is selected; it is shown in a display in the immediately following state 404. The first function 405 associated with a scroll key causes a transition to state 406 where the next entry in the list is selected before returning to state 404 where the newly selected entry is now shown. Correspondingly the second function 407 associated with the scroll key causes a transition to state 408 where the first entry in the immediately following section is selected before returning to state 404 where again the newly selected entry is now shown. Other ways of exiting state 404 are the reception of a call command 409 or a quit scrolling command 410, which both cause the device to exit scrolling according to state 411 and initiate some other state 412.

Figure 5:
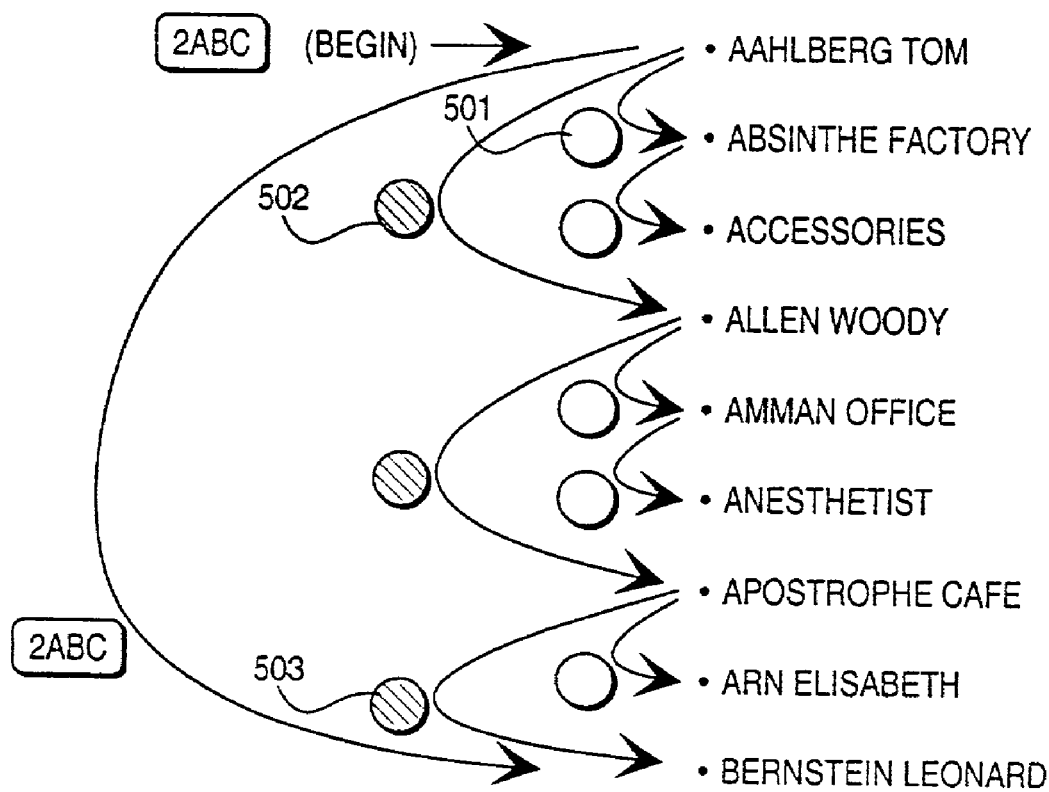
FIG. 5 illustrates a method according to another embodiment of the invention.

FIG. 5 illustrates another method according to an embodiment of the invention. This particular method is a kind of hybrid approach combining features from the known procedure of FIG. 1 and the previously explained embodiments of the invention. Beginning the scrolling produces again the first entry AAHLBERG TOM in the list. However, there has been defined sectioning within those entries where the value in the NAME field begins with the same letter. In other words, if the user wants to move from one initial letter to another, he uses the alphanumeric keys just as in the prior art method explained previously. However, the invention is applied to accelerate the scrolling of entries with the same initial letter. Simple short or light presses 501 on a scrolling key (or more generally: activating the scrolling selector with a way that is associated with the first function) cause again the list to be scrolled one entry at a time, but a long or heavy press 502 (or more generally: activating the scrolling selector with a way that is associated with the second function) causes the scrolling to jump from one entry to the Nth following entry, where N is again either a preprogrammed constant or a user-settable variable. Here we assume that N is three. The only exception from jumping to the Nth following entry is the one where such a jump would bypass the first entry with immediately following initial letter. In FIG. 5 the last press 503 shows a shortened jump from APOSTROPHE CAFE to the second following entry BERNSTEIN LEONARD, because it happens to be the first one where the value in the NAME field begins with B.

In the foregoing we have only described scrolling with the help of one index field. However, the invention is also applicable to scrolling with multiple index fields. As an example we describe the method illustrated in FIG. 6 where after the initiating step 601 there comes the step 602 of choosing the first field for indexing. For the sake of example we may assume that the first field for indexing is the value of the first character in a NAME field, and the second field for indexing is the value of the second character in a NAME field. The second indexing field could equally well be any other field or any part of any field.

In the example of multiple indexing fields it is advantageous to somehow highlight the currently active indexing field. In the case of letters in the name field we may assume that initially the first letter is highlighted. Otherwise steps 603, 604, 605 and 606 are the same as steps 302, 303, 304 and 306 respectively in FIG. 3. At step 607 the device checks, whether the user has actuated the field switching actuator which may be an actuator for itself or just another function associated with the same scrolling actuator which is used for the other functions. A positive finding at step 607 means a detour through step 608 where the indexing field is changed. After changing the indexing field the scrolling continues according to the values in the newly selected field, which is most advantageously highlighted in order to emphasize the change. Otherwise the method proceeds through steps 609, 610, 611, 612, 613, 614, 615, 616 and 617 as was described regarding steps 305, 306, 307, 308, 309, 310, 311, 312, 313 and 314 in FIG. 3.

Figure 6:
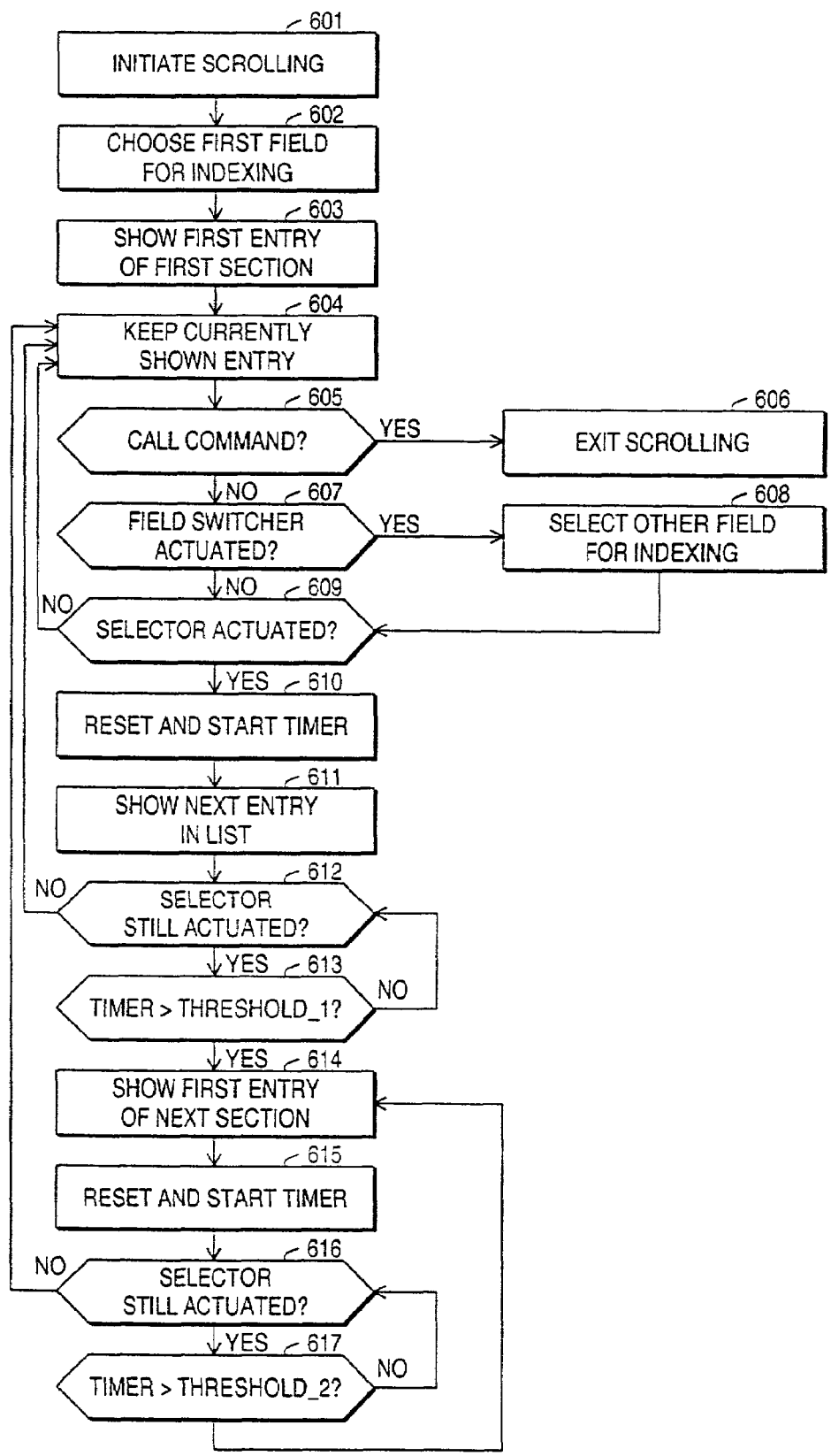
FIG. 6 illustrates a method according to another embodiment of the invention.
Figures 7A, 7B:
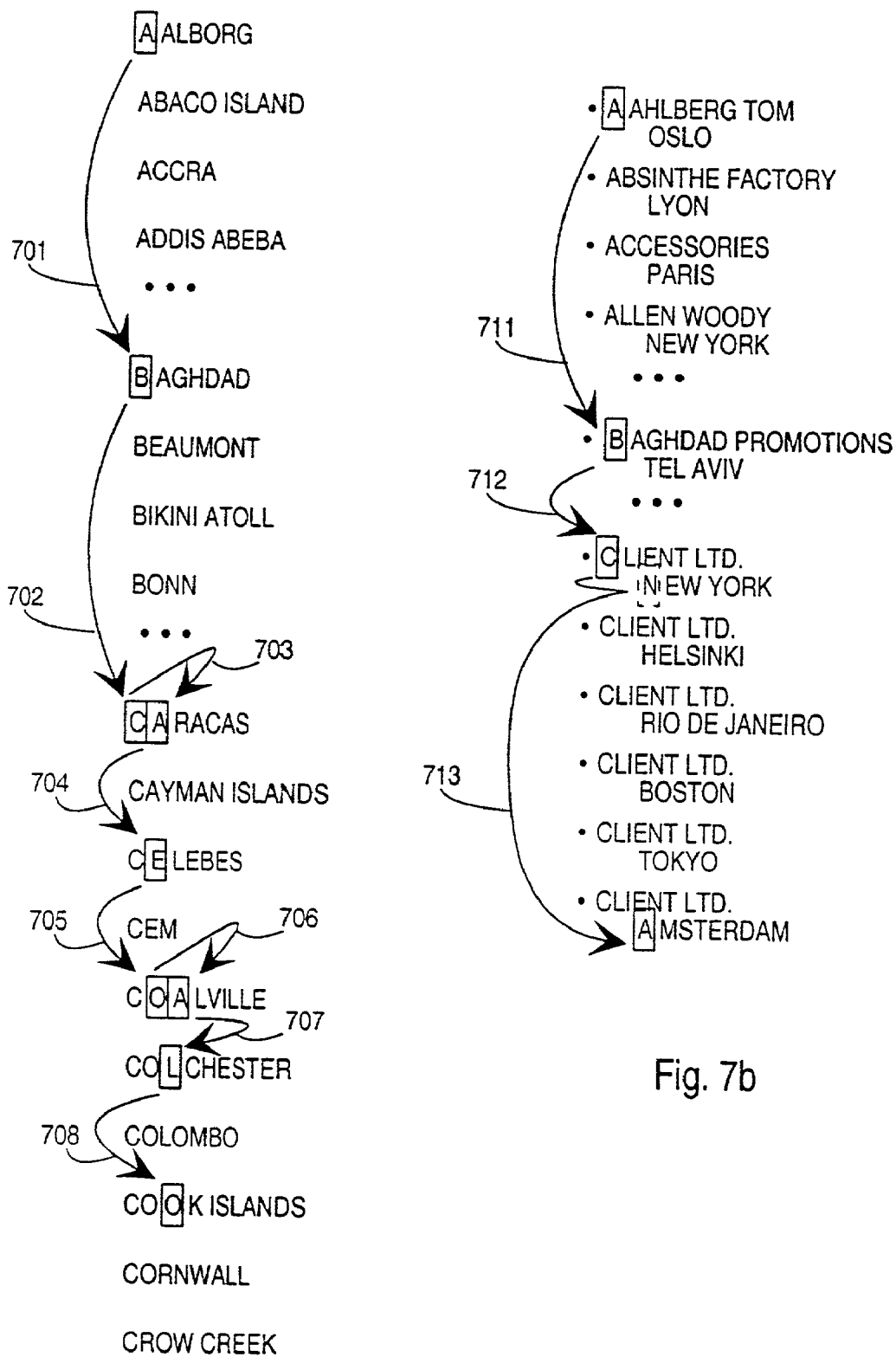
FIG. 7a illustrates the use of one embodiment of the method of FIG. 6.
FIG. 7b illustrates the use of another embodiment of the method of FIG. 6.

FIG. 7a illustrates the application of the method of FIG. 6 in an alphabetical list where the entry COOK ISLANDS should be found. At the beginning the first entry AALBORG in the list appears, and the first letter of the NAME field is highlighted. The user keeps the scrolling selector actuated so that a path through steps 605, 607, 609, 610, 611, 612, 613 and 614, one and a half rounds through steps 614, 615, 616 and 617 and a jump back from step 616 (second visit) to step 604 bring the selection to CARACAS as is shown by arrows 701 and 702. Here the user actuates the field switcher so that the second letter in the NAME field is selected as the indexing field as is shown by arrow 703. Thereafter keeping the scrolling selector activated results similarly into two jumps 704 and 705 into COALVILLE. Again the user switches the indexing field, now to the third letter in the NAME field according to arrow 706. Finally keeping the scrolling selector again activated results into two jumps 707 and 708 into COOK ISLANDS.

FIG. 7b illustrates the application of the method of FIG. 6 in a list where each entry comprises a NAME field and a CITY field. The Amsterdam offices of a company called Client Ltd. should be found. At the beginning the first entry AAHLBERG TOM in the list appears, and the first letter of the NAME field is highlighted. The user keeps the scrolling selector actuated so that a path through steps 605, 607, 609, 610, 611, 612, 613 and 614, one and a half rounds through steps 614, 615, 616 and 617 and a jump back from step 616 (second visit) to step 604 bring the selection to the first occurrence of CLIENT LTD. as is shown by arrows 711 and 712. Here the user actuates the field switcher to select the CITY field as the active indexing field. Arrow 713 shows how this selection alone produces the requested end result, since selecting the CITY field as the active indexing field immediately reorganizes the list so that all entries with the same value in the NAME field are put into logical alphabetical order according to the value in the CITY field.

Figure 8A:
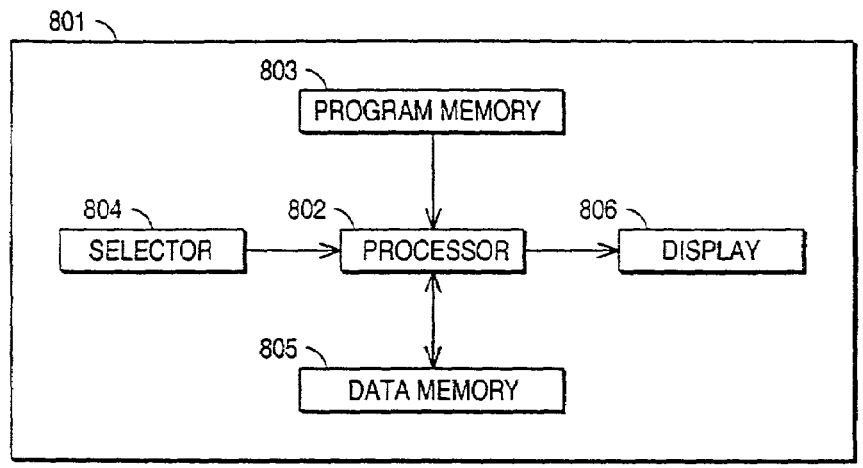
FIGS. 8a, 8b and 8c illustrate arrangements according to various embodiments of the invention.
Figure 8B:
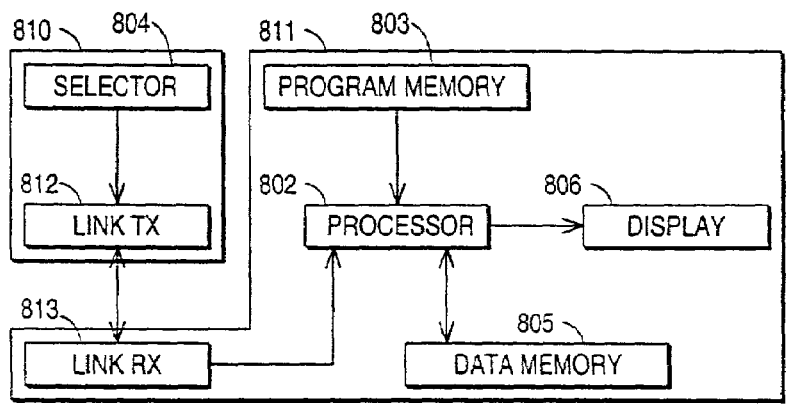
Figure 8C:
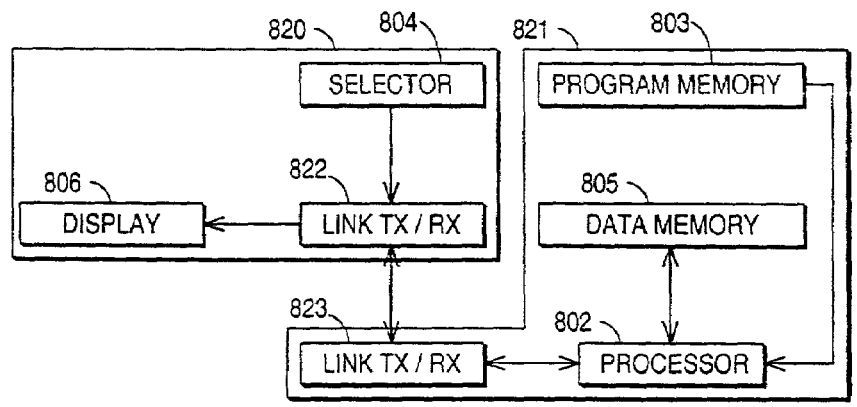

FIGS. 8a, 8b and 8c show various hardware arrangements according to certain embodiments of the invention. FIG. 8a shows a single device 801 which may be for example a mobile telecommunication apparatus, a personal digital assistant or some other small-sized portable electronic device. The most important hardware components in all FIGS. 8a, 8b and 8c are a processor 802 which is executing a program stored in a program memory 803, a selector 804 which is used for scrolling and which has at least two functions associated therewith, a data memory which the processor 802 uses to store the entries of the indexed list, and a display 806 which the processor 802 uses to show the selected entries to the user. In FIG. 8b there are two separate devices 810 and 811 which may be for example a mobile telecommunication apparatus 811 and a remote controller 810. There is a unidirectional link therebetween consisting of a transmitter 812 and a receiver 813 so that the commands given through the selector 804 may be transferred to the other device and into the knowledge of the processor 802. In FIG. 8c there are again two devices 820 and 821, for example a mobile telecommunication apparatus 821 and a versatile remote controller 810 with a display 806 of its own, and the link is bidirectional and consists of two transceivers 822 and 823. The links shown in FIGS. 8a, 8b and 8c can be e.g. wired links or short distance wireless links like the known Bluetooth radio link.

If the selector 804 is a push-button key and the "duration" approach is used, the processor 802 may comprise a timer with its associated starting, stopping and resetting means that are used to conclude, whether a user executes a short press or a long press. Such a construction is advantageous in the sense that a minimum number of input lines are required between the selector 804 and the processor 802. Alternatively there may be, at the selector 804 or somewhere between it and the processor 802, a command interpreter unit where the short and long presses of the key are converted into two unique input signals to the processor. Such an interpreter unit is simple to construct from a capacitor the charging of which takes place only when the selector is activated. If the "force" approach is used, the selector 804 must itself comprise a mechanical structure which responds differently to light actuation and heavy actuation, and gives two unique signals to the processor depending on which actuation occurred. The construction of such mechanical structures is within the capability of a person skilled in the art and as such outside the scope of the present invention.

According to the invention the machine readable instructions that cause a processor to implement a method according to the invention are stored into the program memory 803 of the processor as a computer program. Such programming is as such within the capabilities of a person skilled in the art. In addition to or in place of using a display for giving a visual indication of the currently selected entry, also other forms like audible indication (e.g. synthesized speech) or tactile indication (e.g. Braille indicator) can be used.

The exemplary embodiments of the invention which were described above should not be construed to place limitations to the applicability of the appended claims. Especially the various further developments to the basic inventive idea can be combined into each other on multiple ways. The embodiments recited in the depending claims can be freely combined to each other unless explicitly stated otherwise.

What is claimed is:

1. A method for scrolling between character string entries in an indexed list as a response to scrolling commands given through the activation of selectors, comprising the steps of:
   arranging the indexed list into sections so that the common factor of all entries of a section is the sameness of one first character and each section has a first entry,
   scrolling to the first entry of a section as a response to a first scrolling command; and
   scrolling from an entry in the indexed list to the immediately adjacent entry in the indexed list as a response to a second scrolling command;

wherein:
the step of scrolling to the first entry of a section is executed as a response to a first scrolling command given through the activation of a scrolling selector,
the step of scrolling from an entry in the indexed list into the immediately adjacent entry in the indexed list is executed as a response to a second scrolling command given through the activation of the same scrolling selector, and
the method further comprises a step of responding to a third scrolling command given through the activation of the same scrolling selector by scrolling from a first section to a second section so that at least one other whole section is left between said first and second sections,
wherein said first, second and third commands are all different kinds of commands.

2. A method according to claim 1, wherein:
the step of arranging the indexed list into sections comprises the step of arranging the indexed list into sections so that each section consists of all those entries of the indexed list that have, in a first field, a value that begins with a same character, and
as a consequence, the step of scrolling to the first entry of a section corresponds to:
starting from within a first section where all entries of said first section have, in said first field, a value that begins with a first character,
switching to a second section where all entries of said second section have, in said first field, a value that begins with a second character which in an indexing order of characters is adjacent to said first character, and
scrolling to the first entry of said second section.

3. A method according to claim 1, wherein:
the step of arranging the indexed list into sections comprises the step of arranging the indexed list into sections so that each section consists of entries that have, in a first field, a value that begins with a same character, and each section additionally has at most a maximum number of entries, and
as a consequence, the step of scrolling to the first entry of a section corresponds to:
starting from within a first section where all entries of said first section have, in said first field, a value that begins with a first character,
switching to a second section where all entries of said second section have, in said first field, a value that also begins with said first character, if:
the indexed list contains more than said maximum number of entries that have, in said first field, a value that begins with said first character, and
if the scrolling was towards the last entry of the indexed list, the last entry of said first section was not the last entry of the indexed list where said first field has a value that begins with said first character, and
if the scrolling was towards the first entry of the indexed list, the first entry of said first section was not the first entry of the indexed list where said first field has a value that begins with said first character; and
switching to a second section where all entries of said second section have, in said first field, a value that begins with a second character which is adjacent to said first character in an indexing order of characters, if:

the indexed list contains less than said maximum number of entries that have, in said first field, a value that begins with said first character, or
if the scrolling was towards the last entry of the indexed list, the last entry of said first section was the last entry of the indexed list where said first field has a value that begins with said first character, or
if the scrolling was towards the first entry of the indexed list, the first entry of said first section was the first entry of the indexed list where said first field has a value that begins with said first character; and
scrolling to the first entry of said second section.

4. A method according to claim 1, wherein:
the step of arranging the indexed list into sections comprises the step of arranging the indexed list into sections so that each section consists of all those entries of the indexed list that have, in a first field, a value that begins with one of a number of characters that form a first continuous group of adjacent characters in an indexing order of characters, and
as a consequence, the step of scrolling to the first entry of a section corresponds to:
starting from within a first section where the entries of said first section have, in said first field, a value that begins with one of said number of characters that form a first continuous group,
switching to a second section where the entries of said second section have, in said first field, a value that begins with one of a number of characters that form a second continuous group of adjacent characters in said indexing order of characters, which second group is adjacent to said first group in said indexing order of characters, and
scrolling to the first entry of said second section.

5. A method according to claim 1, additionally comprising the step of changing, as a response to a field changing command, the field having the values which determine the indexing order of entries in the indexed list.

6. A method according to claim 1, comprising the step of measuring an activation time of said scrolling selector in order to determine whether a first scrolling command or a second scrolling command is given.

7. A method according to claim 1, comprising the step of measuring an activation force of said scrolling selector in order to determine whether a first scrolling command or a second scrolling command is given.

8. An arrangement for scrolling between character string entries in an indexed list, comprising:
an activatable scrolling selector,
indication means for indicating selected entries,
a data memory for storing and retrieving entries of the indexed list, and
a processor which is arranged to respond to scrolling commands given through the activation of the scrolling selector by selecting stored entries from the data memory and indicating selected entries through the indication means;
wherein the processor is arranged to:
arrange the indexed list into sections so that the common factor of all entries of a section is the saneness of one first character and each section has a first entry,
respond to a first scrolling command given through the activation of the scrolling selector by scrolling to the first entry of a section of the indexed list and selecting said first entry for indication through the indication means, respond to a second scrolling command given through the activation of the sane scrolling selector by scrolling from an entry in the indexed list into the immediately adjacent entry in the indexed list and selecting said immediately adjacent entry for indication through the indication means, and respond to a third scrolling command given through the activation of the same scrolling selector by scrolling from a first section to the first entry of a second section so that at least one other whole section is left between said first and second sections and selecting said first entry for of said second section indication through the indication means, wherein said first, second and third commands are all different kinds of commands.

9. An arrangement according to claim 8, wherein the activatable scrolling selector is a push-button key, and the arrangement comprises timer means for determining whether the push-button key was pressed for a short time or a long time.

10. An arrangement according to claim 8, wherein the activatable scrolling selector is a push-button key, and the arrangement comprises means for determining whether the push-button key was pressed lightly or heavily.

11. An arrangement according to claim 8, wherein the activatable scrolling selector is a scrolling wheel, and the arrangement comprises means for determining whether the scrolling wheel was rotated slowly or fast.

12. An arrangement according to claim 8, wherein the activatable scrolling selector, the indication means, the data memory and the processor are all located within a single device.

13. An arrangement according to claim 8, wherein the activatable scrolling selector is located within a first device and the processor is located within a second device which is physically different than said first device, and the arrangement further comprises means for setting up a communication link between the first device and the second device.

14. An arrangement according to claim 13, wherein the display is located within said first device together with the scrolling selector.

* * * * *